(12) United States Patent
Jung et al.

(10) Patent No.: US 12,054,844 B2
(45) Date of Patent: Aug. 6, 2024

(54) BLANK FOR HOT STAMPING, METHOD FOR MANUFACTURING THE SAME, HOT STAMPING COMPONENT, AND METHOD FOR MANUFACTURING THE SAME

(71) Applicant: Hyundai Steel Company, Incheon (KR)

(72) Inventors: Seung Pill Jung, Incheon (KR); Hye Jin Kim, Incheon (KR); Kyu Yeon Hwang, Incheon (KR); Hyun Yeong Jung, Incheon (KR); Jin Ho Lee, Dong-gu (KR)

(73) Assignee: Hyundai Steel Company, Incheon (KR)

( * ) Notice: Subject to any disclaimer, the term of this patent is extended or adjusted under 35 U.S.C. 154(b) by 146 days.

(21) Appl. No.: 17/109,916

(22) Filed: Dec. 2, 2020

(65) Prior Publication Data

US 2021/0189582 A1 Jun. 24, 2021

(30) Foreign Application Priority Data

Dec. 20, 2019 (KR) .................. 10-2019-0171795
Sep. 29, 2020 (KR) .................. 10-2020-0127390

(51) Int. Cl.
| | | |
|---|---|---|
| C25D 3/44 | (2006.01) | |
| B21D 22/02 | (2006.01) | |
| B21D 37/16 | (2006.01) | |
| C22C 38/00 | (2006.01) | |
| C22C 38/02 | (2006.01) | |
| C22C 38/28 | (2006.01) | |

(Continued)

(52) U.S. Cl.
CPC ............. *C25D 3/44* (2013.01); *B21D 22/022* (2013.01); *B21D 37/16* (2013.01); *C22C 38/002* (2013.01); *C22C 38/02* (2013.01); *C22C 38/28* (2013.01); *C22C 38/32* (2013.01); *C22C 38/38* (2013.01); *C23C 2/26* (2013.01); *C23C 2/28* (2013.01); *C23C 2/29* (2022.08); *C25D 5/36* (2013.01); *C25D 5/48* (2013.01)

(58) Field of Classification Search
None
See application file for complete search history.

(56) References Cited

U.S. PATENT DOCUMENTS 9,963,758 B2  5/2018  Sohn et al.
10,286,439 B2  5/2019  Jin et al.
(Continued)

FOREIGN PATENT DOCUMENTS

CN  106164317 A  11/2016
CN  107614733 A  1/2018
(Continued)

OTHER PUBLICATIONS

Office Action issued Feb. 28, 2023 in corresponding Chinese Application No. 202080041211.3.
(Continued)

*Primary Examiner* — Daniel J. Schleis
(74) *Attorney, Agent, or Firm* — Fox Rothschild LLP

(57) ABSTRACT

Disclosed is a method of manufacturing a blank for hot stamping, which includes forming a plated layer on a steel plate by immersing the steel plate in a plating bath including aluminum and silicon; and heating the steel plate on which the plated layer is formed at a first temperature for a first time period.

6 Claims, 10 Drawing Sheets

(51) Int. Cl.
*C22C 38/32* (2006.01)
*C22C 38/38* (2006.01)
*C23C 2/26* (2006.01)
*C23C 2/28* (2006.01)
*C25D 5/36* (2006.01)
*C25D 5/48* (2006.01)

(56) References Cited

U.S. PATENT DOCUMENTS

| | | |
|---|---|---|
| 10,590,522 B2 | 3/2020 | Oh et al. |
| 10,655,204 B2 | 5/2020 | Kim |
| 2008/0286603 A1 | 11/2008 | Oh et al. |
| 2016/0362764 A1 | 12/2016 | Sohn et al. |
| 2018/0142337 A1 | 5/2018 | Kim |
| 2019/0003029 A1* | 1/2019 | Oh .................... C22C 38/04 |
| 2020/0087747 A1 | 3/2020 | Kim et al. |
| 2020/0385836 A1 | 12/2020 | Yi et al. |

FOREIGN PATENT DOCUMENTS

| | | | |
|---|---|---|---|
| CN | 108474096 A | 8/2018 | |
| EP | 1830147 A1 | 9/2007 | |
| JP | 5444650 B2 | 3/2014 | |
| JP | 2015131995 A | 7/2015 | |
| KR | 100723157 B1 | 5/2007 | |
| KR | 20110038763 A | 4/2011 | |
| KR | 101333977 B1 | 12/2013 | |
| KR | 101569509 B1 | 11/2015 | |
| KR | 101696069 B1 | 1/2017 | |
| KR | 101696121 B1 | 1/2017 | |
| KR | 101858868 B1 | 5/2018 | |
| KR | 20180095757 A | 8/2018 | |
| WO | WO-2017111525 A1 * | 6/2017 | ........... B32B 15/012 |
| WO | 2019/205698 A1 | 10/2019 | |
| WO | 2019205698 A1 | 10/2019 | |

OTHER PUBLICATIONS

Office Action issued Oct. 19, 2023 in corresponding Chinese Application No. 202080041211.3.

* cited by examiner

BLANK FOR HOT STAMPING, METHOD FOR MANUFACTURING THE SAME, HOT STAMPING COMPONENT, AND METHOD FOR MANUFACTURING THE SAME

CROSS-REFERENCE TO RELATED APPLICATIONS

This application is based on and claims priority under 35 U.S.C. § 119 to Korean Patent Application Nos. 10-2019-0171795, filed on Dec. 20, 2019, and 10-2020-0127390, filed on Sep. 29, 2020, in the Korean Intellectual Property Office, the disclosures of which are incorporated by reference herein in their entirety.

BACKGROUND

1. Field

The present disclosure relates to a blank for hot stamping, a method of manufacturing the same, a hot-stamping component, and a method of manufacturing the hot-stamping component.

2. Description of the Related Art

As environmental regulations and fuel economy-related regulations are strengthened all over the world, the need for lighter materials for vehicles is increasing. Accordingly, research on and development of ultra-high-strength steel and hot-stamping steel have been actively conducted. Among these, a hot stamping process generally includes heating/molding/cooling/trimming operations and uses a phase transformation of materials and a change in microstructures during the process.

Recently, studies have been actively conducted to prevent the occurrence of delayed fracture that occurs in a hot-stamping component manufactured by a hot stamping process as well as to improve the corrosion resistance and weldability of the same. Related technologies include a Korean Patent Publication No. 10-2018-0095757, directed to a method of manufacturing a hot-stamping component, and the like.

SUMMARY

Exemplary embodiments of the present disclosure provide a blank for hot stamping, which may prevent or minimize the occurrence of a hydrogen delayed fracture and mold seizure during a hot-stamping operation, a method of manufacturing the blank for hot stamping, a hot-stamping component, and a method of manufacturing the hot-stamping component.

According to an exemplary embodiment of the present disclosure, provided is a method of manufacturing a blank for hot stamping, which includes forming a plated layer on a steel plate by immersing the steel plate in a plating bath including aluminum and silicon; and heating the steel plate on which the plated layer is formed at a first temperature for a first time period, wherein the first temperature is 540° C. to 600° C.

According to the exemplary embodiment, when the first temperature is 540° C., the first time period may be greater than or equal to 60 minutes.

According to the exemplary embodiment, when the first temperature is 600° C., the first time period may be greater than or equal to 10 minutes.

According to the exemplary embodiment, the forming of the plated layer on the steel plate may include forming an aluminum (Al)-silicon (Si) plated layer on the steel plate.

According to the exemplary embodiment, a plating amount of the plated layer may be 40 g/m$^2$ to 200 g/m$^2$.

According to the exemplary embodiment, in the heating of the steel plate on which the plated layer is formed, at least a portion of the steel plate and the plated layer are mutually diffused to form an alloy layer.

According to the exemplary embodiment, the alloy layer may include a single layer.

According to the exemplary embodiment, the method may further include forming a blank by cutting the steel plate on which the alloy layer is formed.

According to another exemplary embodiment, provided is a blank for hot stamping includes a steel plate; and an alloy layer on the steel plate and including a single layer.

According to an exemplary embodiment, the steel plate may include an amount of 0.19 wt % to 0.38 wt % of carbon (C), an amount of 0.1 wt % to 1 wt % of silicon (Si), an amount of 1 wt % to 2 wt % of manganese (Mn), an amount of greater than 0 wt % and less than or equal to 0.03 wt % of phosphorus (P), an amount of greater than 0 wt % and less than or equal to 0.01 wt % of sulfur (S), an amount of 0.1 wt % to 0.6 wt % of chromium (Cr), an amount of 0.01 wt % to 0.05 wt % of titanium (Ti), an amount of 0.001 wt % to 0.005 wt % of boron (B), remaining iron (Fe), and unavoidable impurities.

According to an exemplary embodiment, the alloy layer may include an iron-aluminum-silicon (FeAlSi) alloy.

According to another exemplary embodiment, provided is a method of manufacturing a hot-stamping component, which includes heating a steel plate on which a plated layer is formed at a first temperature for a first time period; forming a blank by cutting the heated steel plate; step heating the blank in stages; and soaking the stepwise heated blank at a temperature of Ac3 to 1000° C., wherein the first temperature is 540° C. to 600° C.

According to the exemplary embodiment, when the first temperature is 540° C., the first time period may be greater than or equal to 60 minutes.

According to the exemplary embodiment, when the first temperature is 600° C., the first time period may be greater than or equal to 10 minutes.

According to the exemplary embodiment, the step heating and the soaking may be performed in a heating furnace having a plurality of sections having different temperature ranges from each other.

According to the exemplary embodiment, among the plurality of sections, a ratio of a length of sections for step heating the blank to a length of a section for soaking the blank may be in a range of 1:1 to 4:1.

According to the exemplary embodiment, temperatures of the plurality of sections may increase in a direction from an inlet of the heating furnace to an outlet of the heating furnace.

According to the exemplary embodiment, a difference in temperature between two adjacent sections among the sections for step heating the blank may be greater than 0° C. and less than or equal to 100° C.

According to the exemplary embodiment, among the plurality of sections, a temperature of the section for soaking the blank may be higher than a temperature of the sections for step heating the blank.

According to the exemplary embodiment, the method may further include: after the soaking of the blank, transferring the soaked blank from the heating furnace to a press mold; forming a molded body by hot-stamping the transferred blank; and cooling the formed molded body.

According to another exemplary embodiment, provided is a hot-stamping component, which includes a steel plate; and an alloy layer having a first layer, a second layer, and a third layer, which are sequentially stacked on the steel plate, wherein an area fraction of the second layer with respect to the alloy layer is greater than 0% and less than or equal to 33%.

According to the exemplary embodiment, the first layer may include $\alpha$-Fe, the second layer may include $Fe_2Al_5$, and the third layer may include FeAl.

According to the exemplary embodiment, the first layer may have a hardness of 200 Hv to 800 Hv, the second layer may have a hardness of 700 Hv to 1200 Hv, and the third layer may have a hardness of 200 Hv to 800 Hv.

DETAILED DESCRIPTION

Figure 1:
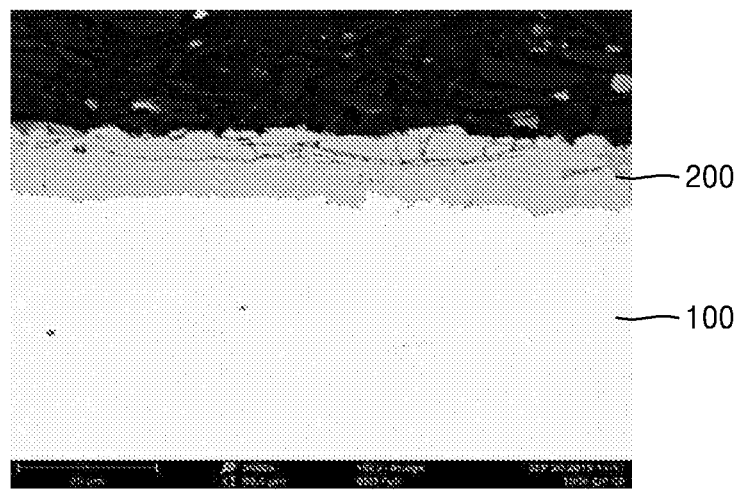
FIG. 1 is a cross-sectional view of a blank for hot stamping according to an exemplary embodiment.

As the present disclosure allows for various changes and numerous embodiments, particular embodiments will be illustrated in the drawings and described in detail in the written description. Effects, features, and methods of achieving the same of the present disclosure are described in detail below with drawings. This present disclosure may, however, be embodied in many different forms and should not be construed as being limited to the exemplary embodiments set forth herein.

In the following exemplary embodiments, such terms as "first," "second," etc., may be used to describe various components and to distinguish one component from the other component, such components must not be limited to the above terms.

An expression used in the singular encompasses the expression of the plural, unless it has a clearly different meaning in the context.

In the following embodiments, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a layer, region, or component is referred to as being "formed on" another layer, region, or component, it can be directly or indirectly formed on the other layer, region, or component.

Sizes of components in the drawings may be exaggerated or reduced for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Hereinafter, the present disclosure will be described more fully with reference to the accompanying drawings, in which exemplary embodiments of the inventive concept are shown. Likewise, reference numerals may denote like elements in different drawings.

FIG. 1 is a cross-sectional view of a blank for hot stamping according to an exemplary embodiment.

Referring to FIG. 1, a blank for hot stamping according to an embodiment may include a steel plate 100 and a first alloy layer 200 on the steel plate 100.

The steel plate 100 may be a steel plate manufactured by performing a hot-rolling operation and/or a cold-rolling operation on cast steel slabs to include a certain alloying element in a certain content. For example, the steel plate 100 may include carbon (C), silicon (Si), manganese (Mn), phosphorus (P), sulfur (S), titanium (Ti), boron (B), remaining iron (Fe), and other unavoidable impurities. In addition, the steel plate 100 may further include one or more components of niobium (Nb), molybdenum (Mo), and aluminum (Al).

C is a major element that determines strength and hardness of the steel plate 100, and is added to secure the tensile strength and hardenability characteristics of the steel plate 100 after a hot stamping operation. For example, an amount of 0.19 wt % to 0.38 wt % of C may be included based on a total weight of the steel plate 100. When a content of C is less than 0.19 wt %, the mechanical strength of the steel plate 100 may be difficult to be secured. On the other hand, when the content of C exceeds 0.38 wt %, the toughness of the steel plate 100 may be reduced or a problem of brittleness control may be caused.

Si is a solid solution strengthening element, which may improve strength and ductility of the steel plate 100. In addition, Si may suppress the formation of cementite, which is a starting point of crack due to hydrogen embrittlement. Based on the total weight of the steel plate 100, an amount of 0.1 wt % to 1 wt % of Si may be included. When a content of Si is less than 0.1 wt %, the above-described effect may be difficult to obtain. On the other hand, when the content of Si exceeds 1 wt %, the plating characteristics of the steel plate 100 may be reduced.

Mn is added to increase the hardenability and strength of the steel plate 100 during heat treatment. Based on the total weight of the steel plate 100, an amount of 1 wt % to 2 wt % of Mn may be included. When a content of Mn is less than 1 wt %, a grain refining effect may not be sufficient, and the hard phase fraction of a hot-stamping component may be insufficient. On the other hand, when the content of Mn exceeds 2 wt %, the ductility and toughness of the steel plate 100 due to manganese segregation or perlite bands may be reduced, which may cause a decrease in bending performance of the steel plate 100, and a heterogeneous microstructure may occur.

P is added to prevent toughness of the steel plate 100 from reducing. Based on the total weight of the steel plate 100, an amount of greater than 0 wt % and less than or equal to 0.03 wt % of P may be included. When a content of P exceeds 0.03 wt %, an Fe—P compound is formed to reduce toughness of the steel plate 100, and cracks may be caused in the steel plate 100 during a manufacturing operation.

Based on the total weight of the steel plate 100, an amount of greater than 0 wt % and less than or equal to 0.03 wt % of S may be included. When a content of S exceeds 0.01 wt %, hot-workability of the steel plate 100 may be reduced, and surface defects such as cracks may occur due to the formation of large inclusions.

Chromium (Cr) is added to improve the hardenability and strength of the steel plate 100. Based on the total weight of the steel plate 100, an amount of 0.1 wt % to 0.6 wt % of Cr may be included. When a content of Cr is less than 0.1 wt %, an effect of improving the hardenability and strength of the steel plate 100 may not be sufficient. On the other hand, when the content of Cr exceeds 0.6 wt %, production cost may increase and the toughness of the steel plate 100 may decrease.

Titanium (Ti) is added to enhance the hardenability of the steel plate 100 by forming precipitates after a hot-stamping heating treatment, and improve materials of the steel plate 100. In addition, Ti forms a precipitated phase such as Ti(C, N) or the like at a high temperature, thereby effectively contributing to refinement of austenite grains. Based on the total weight of the steel plate 100, an amount of 0.01 wt % to 0.05 wt % of Ti may be included. When a content of Ti is less than 0.01 wt %, the formation of precipitates is insignificant and the grain refining effect may not be sufficient. On the other hand, when the content of Ti exceeds 0.05 wt %, an elongation percentage of the steel plate 100 may be decreased and a decrease in toughness of the same may occur.

Boron (B) is added to secure hardenability and strength of the steel plate 100 by obtaining a martensitic structure. B also has a grain refining effect by increasing an austenite grain growth temperature. Based on the total weight of the steel plate 100, an amount of 0.001 wt % to 0.005 wt % of B may be included. When a content of B is less than 0.001 wt %, an effect of improving the hardenability of the steel plate 100 may not be sufficient. On the other hand, when the content of B exceeds 0.005 wt %, the risk of brittleness and the risk of low elongation percentage of the steel plate 100 may increase.

For example, the first alloy layer 200 may be formed on at least one surface of the steel plate 100, and may be provided as a single layer. For example, the first alloy layer 200 may be formed of an FeAlSi alloy.

As described below, the steel plate 100 and an Al—Si plated layer on the steel plate 100 may be heated at a first temperature for a first time period, so that the steel plate 100 and the Al—Si plated layer may be alloyed to form the first alloy layer 200. At this time, the Al—Si plated layer may not remain on the steel plate 100, and at least a portion of the steel plate 100 and the entire Al—Si plated layer may be alloyed.

Figure 2:
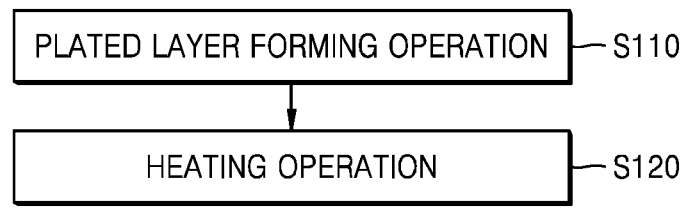
FIG. 2 is a schematic flowchart illustrating a method of manufacturing a blank for hot stamping according to an exemplary embodiment.
Figure 3:
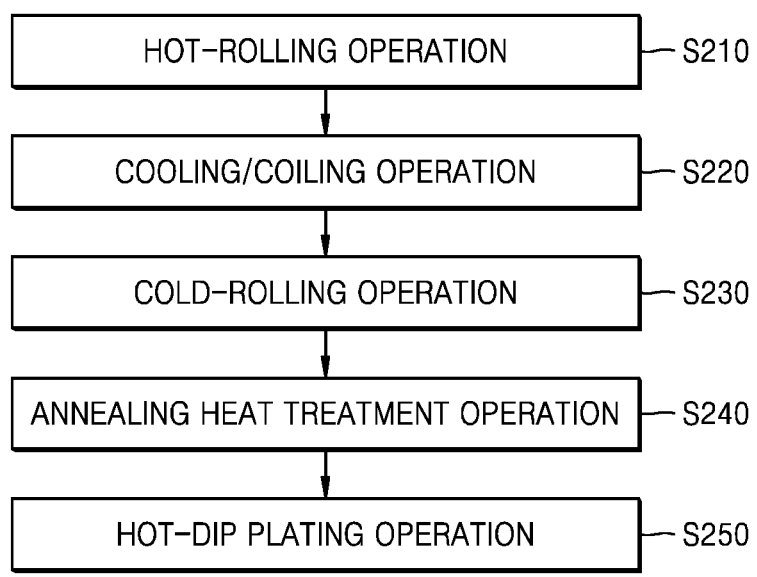
FIG. 3 is a schematic flowchart illustrating an operation of manufacturing a steel plate of FIG. 2 according to an exemplary embodiment.

FIG. 2 is a schematic flowchart illustrating a method of manufacturing a blank for hot stamping according to an exemplary embodiment, and FIG. 3 is a schematic flowchart illustrating an operation of manufacturing a steel plate of FIG. 2. Hereinafter, the method of manufacturing a blank for hot stamping will be described with reference to FIGS. 2 and 3.

Referring to FIG. 2, the method of manufacturing a blank for hot stamping according to an exemplary embodiment may include a plated layer forming operation S110 and a heating operation S120.

As shown in FIG. 3, the plated layer forming operation S110 may include a hot-rolling operation of a steel slab S210, an cooling/coiling operation S220, a cold-rolling operation S230, an annealing heat treatment operation S240, and a hot-dip plating operation S250. First, a half-finished steel slab, which is a target of an operation of forming a steel plate, is prepared. At this time, the steel slab may include an amount of 0.19 wt % to 0.38 wt % of C, an amount of 0.1 wt % to 1 wt % of Si, an amount of 1 wt % to 2 wt % of Mn, an amount of greater than 0 wt % and less than or equal to 0.03 wt % of P, an amount of greater than 0 wt % and less than or equal to 0.01 wt % of S, an amount of 0.1 wt % to 0.6 wt % of Cr, an amount of 0.01 wt % to 0.05 wt % of Ti, an amount of 0.001 wt % to 0.005 wt % of B, remaining Fe, and unavoidable impurities.

A reheating operation is performed on the steel slab for hot-rolling. In the operation of reheating the steel slab, segregated components, during casting, are re-used by reheating the steel slab secured through a continuous casting operation in a certain temperature. For example, a slab reheating temperature (SRT) may be 1200° C. to 1400° C. When the SRT is less than 1200° C., the segregated components may not be sufficiently re-used during casting, and thus, it may be difficult to observe a large homogenization effect of alloying elements. Also, a large solution effect of Ti may be difficult to be observed. Although a higher SRT is beneficial to homogenization, when the SRT exceeds 1400° C., it is difficult to secure the strength of a steel plate due to an increase in austenite grain size, and the manufacturing cost of the steel plate may increase due to an excessive heating operation.

In the hot-rolling operation of a steel slab S210, the reheated steel slab is hot-rolled at a certain finishing delivery temperature (FDT). For example, the FDT may be 880° C. to 950° C. At this time, when the FDT is less than 880° C., it may be difficult to secure workability of a steel plate since a duplex grain structure occurs due to abnormal region rolling, and the workability of the steel plate is reduced due to uneven microstructures and also mass flowing during hot-rolling may occur due to a rapid phase change. When the FDT exceeds 950° C., austenite grains may become coarse. In addition, TiC precipitates become coarse, and the performance of a hot-stamping component may decrease.

In the cooling/coiling operation S220, the hot-rolled steel plate is cooled to a certain coiling temperature (CT) to be coiled. For example, the CT is 550° C. to 800° C. The CT affects the redistribution of C, and when the CT is less than 550° C., the low-temperature phase fraction due to subcooling may increase, a rolling load may be deepened during cold-rolling, and the ductility of the steel plate may rapidly decrease. On the other hand, when the CT exceeds 800° C., deterioration in the moldability and strength of the steel plate may occur due to abnormal grain growth or excessive grain growth.

In the cold-rolling operation S230, the coiled steel plate is uncoiled to perform pickling, and then cold-rolled. At this time, pickling is performed to remove the scale of the coiled steel plate, that is, the scale of a hot-rolled coil manufactured through the hot-rolling operation described above.

The annealing heat treatment operation S240 is an operation of performing an annealing heat treatment on the cold-rolled steel plate at a temperature of 700° C. or higher. For example, the annealing heat treatment includes an operation of heating the cold-rolled steel plate and cooling the heated cold-rolled steel plate at a certain cooling rate.

The hot-dip plating operation S250 is an operation of forming a plated layer on the annealed heat-treated steel plate. For example, in the hot-dip plating operation S250, an Al—Si plated layer may be formed on the annealed heat-treated steel plate, that is, the steel plate.

In detail, in the hot-dip plating operation S250, the steel plate may be immersed in a hot-dip plating bath including an amount of 8 wt % to 12 wt % of Si and excess Al. At this time, the hot-dip plating bath may maintain a temperature of 400° C. to 700° C. The plated layer may be formed by plating at 40 g/m² to 200 g/m² based on both surfaces of the steel plate.

The heating operation 120 is an operation of heating the steel plate on which the Al—Si plated layer is formed. In more detail, the heating operation 120 is an operation of forming a first alloy layer by heating the steel plate on which the Al—Si plated layer is formed.

In the heating operation S120, a heating time period and a heating temperature for heating the steel plate on which the Al—Si plated layer is formed may satisfy the following equation.

$$\ln(t) = \alpha + (\beta/(R \times T))  \quad \text{[Equation]}$$

where t denotes the heating time period, α denotes a correction factor according to a plating amount, β denotes a correction factor according to a content of Si in the plated layer, R denotes a gas constant, and T denotes the heating temperature. In the above equation, the heating temperature T means an absolute temperature.

In the method of manufacturing a blank for hot stamping according to an exemplary embodiment, because a plating amount of the Al—Si plated layer formed on the steel plate may be 40 g/m² to 200 g/m², the correction factor according to the plating amount may have a value of −31.09 to −10.36.

In addition, β may have a value of 84752.2 J/mol to 254256.5 J/mol by considering the content of Si in the Al—Si plated layer and an activation energy of Si.

For example, in the heating operation S120, the steel plate on which the Al—Si plated layer is formed may be heated at the heating temperature T. For example, in the heating operation S120, the steel plate on which the Al—Si plated layer is formed may be heated at a first temperature. At this time, the first temperature may be 540° C. to 600° C. When the first temperature is less than 540° C., time required for alloying at least a portion of the steel plate and the Al—Si plated layer may increase, and thus, loss may occur in the operation. On the other hand, when the first temperature exceeds 600° C., in a manufacturing operation of a hot-stamping component to be described below, a liquid phase is formed on a surface of a blank, which may cause mold seizure.

For example, in the heating operation S120, the steel plate on which the Al—Si plated layer is formed may be heated during a heating time period t. For example, in the heating operation S120, the steel plate on which the Al—Si plated layer is formed may be heated during a first time period. At this time, the first time period may be 10 minutes to 120 minutes. In detail, when the first temperature is 540° C., the first time period may be greater than 60 minutes and less than 120 minutes. When the first temperature is 600° C., the first time may be greater than or equal to 10 minutes and less than 60 minutes. When the first time period is less than 10 minutes, the Al—Si plated layer may not be completely alloyed. On the other hand, when the first time period exceeds 120 minutes, the productivity of a hot-stamping component may reduce due to an excessive heating time period.

In the heating operation S120, when the first temperature is 540° C., a minimum time period required for an entire alloying of the Al—Si plated layer may be about 60 minutes. That is, in the heating operation S120, an entire alloy layer may be formed only when the steel plate on which the Al—Si plated layer is formed is heated at 540° C. for about 60 minutes or more. Accordingly, when the first temperature is greater than 540° C., the minimum time period required for forming the entire alloy layer may be less than 60 minutes, and the minimum time may be between 10 minutes to 60 minutes.

In addition, in the heating operation S120, when the first temperature is 600° C., the minimum time period required for the entire alloying of the Al—Si plated layer may be about 10 minutes. That is, in the heating operation S120, the entire alloy layer may be formed only when the steel plate on which the Al—Si plated layer is formed is heated at a temperature of 600° C. for about 10 minutes or more. Accordingly, when the first temperature is less than 600° C., the minimum time period required for forming the entire alloy layer may be more than 10 minutes, and the minimum time period may be between 10 minutes to 60 minutes.

Figure 4:
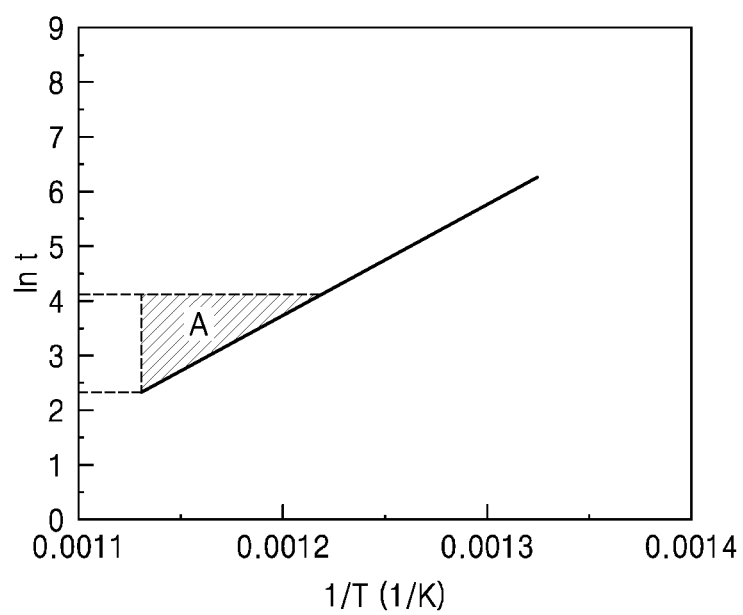
FIG. 4 is a graph showing a section in which a steel plate and a plated layer are alloyed in a method of manufacturing a blank for hot stamping according to an exemplary embodiment.

FIG. 4 is a graph showing a section in which a steel plate and a plated layer are alloyed in a method of manufacturing a blank for hot stamping according to an exemplary embodiment. In detail, FIG. 4 is a diagram showing a section in which a plated layer is alloyed in a graph showing a heating time period according to a heating temperature satisfying an equation.

As described above, in the heating operation S120, the steel plate on which the Al—Si plated layer is formed may heated at the first temperature for the first time period, so that at least a portion of the steel plate and the Al—Si plated layer may be alloyed, and the entire alloy layer may be formed.

Accordingly, in a case corresponding to a section A of FIG. 4, at least a portion of the steel plate and the Al—Si plated layer may be diffused to each other to form a first alloy layer. At this time, the formed first alloy layer may be provided as a single layer. For example, the first alloy layer may be formed of an FeAlSi alloy. For example, the Al—Si plated layer may not remain on the steel plate, and at least a portion of the steel plate and the entire Al—Si plated layer may be alloyed.

Thereafter, a blank forming operation may be performed. The blank forming operation may be an operation of forming a blank by cutting the steel plate on which the first alloy layer is formed. In the blank forming operation, a blank may be formed by cutting the steel plate on which the first alloy layer is formed into a desired shape according to a purpose.

For example, the bank forming operation may be performed before the heating operation S120. For example, after forming a blank by cutting the steel plate on which the Al—Si plated layer is formed, the heating operation S120 of heating the formed blank may be performed.

Figure 5:
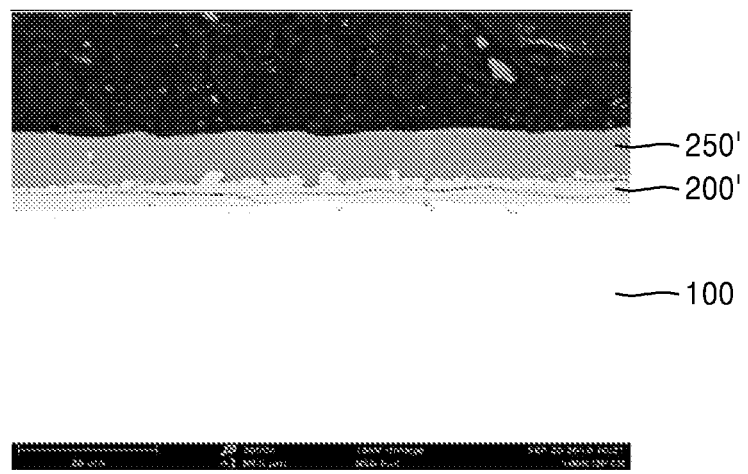
FIG. 5 is a cross-sectional view of a blank for hot stamping manufactured by using a method of manufacturing a blank for hot stamping in which a heating operation is omitted according to an exemplary embodiment.

FIG. 5 is a cross-sectional view of a blank for hot stamping manufactured by using a method of manufacturing a blank for hot stamping in which a heating operation S120 is omitted.

Referring to FIGS. 1 and 5, the blank for hot stamping manufactured by using the method of manufacturing a blank for hot stamping including the heating operation S120 may include the steel plate 100 and the first alloy layer 200 on the steel plate 100. The first alloy layer 200 may be formed by alloying the steel plate 100 and the Al—Si plated layer on the steel plate 100. In detail, the steel plate 100 and the Al—Si plated layer on the steel plate 100 may be heated at the first temperature for the first time period, so that the steel plate 100 and the Al—Si plated layer may be alloyed to form the first alloy layer 200. At this time, the Al—Si plated layer may not remain on the steel plate 100, and at least a portion of the steel plate 100 and the entire Al—Si plated layer may be alloyed.

The blank for hot stamping manufactured by using the method of manufacturing a blank for hot stamping in which the heating operation S120 is omitted may include the steel plate 100, a first alloy layer 200' on the steel plate 100, and an Al—Si plated layer 250' on the first alloy layer 200'.

Accordingly, in the blank for hot stamping in which the heating operation S120 is performed, an entire Al—Si plated layer formed on the steel plate 100 may be alloyed to form the first alloy layer 200. However, in the blank for hot stamping in which the heating operation S120 is omitted, a portion of the Al—Si plated layer may remain on the steel plate 100.

Therefore, because the entire Al—Si plated layer formed on the blank for hot stamping on which the heating operation S120 has been formed is alloyed to form the first alloy layer 200, hydrogen inflow due to the formation of an Al—Si liquid phase on the surface of the blank for hot stamping in an austenitizing operation due to a high-temperature heating treatment and mold seizure may be prevented or minimized.

Figure 6:
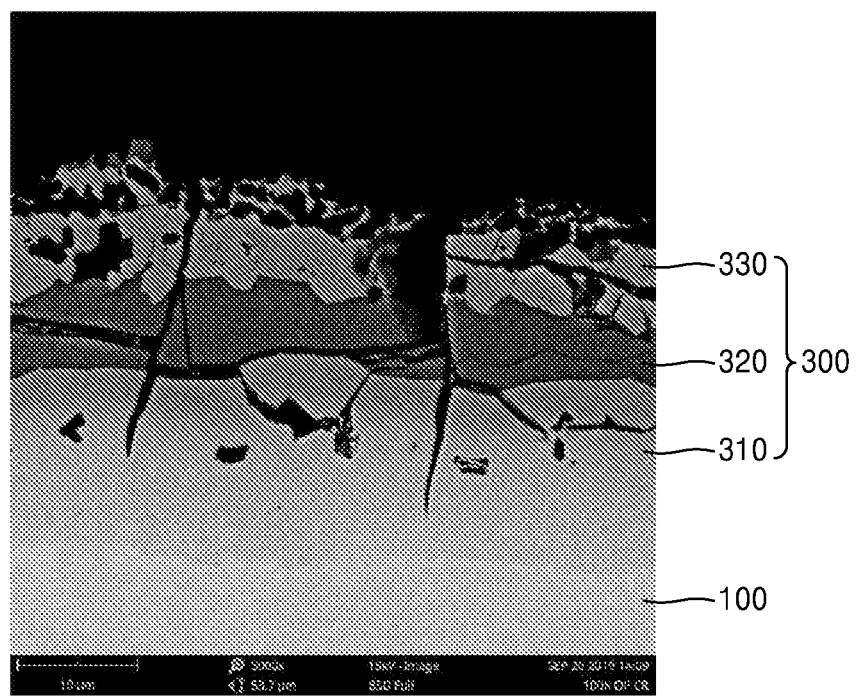
FIG. 6 is a cross-sectional view of a hot-stamping component according to an exemplary embodiment.

FIG. 6 is a cross-sectional view of a hot-stamping component according to an exemplary embodiment.

Referring to FIG. 6, a hot-stamping component according to an embodiment may include the steel plate 100 and a second alloy layer 300 on the steel plate 100 and including a first layer 310, a second layer 320, and a third layer 330, which are sequentially stacked.

The second alloy layer 300 may be formed on at least one surface of the steel plate 100 and may include Al. The second alloy layer 300 may include the first layer 310, the second layer 320, and the third layer 330 which are sequentially stacked on the steel plate 100. The third layer 330 may include an FeAl phase.

The first layer 310 may include alloyed Fe, Al, and Si. For example, the first layer 310 may have an α-Fe phase.

The second layer 320 may have an $Fe_2Al_5$ phase. For example, an area fraction of the second layer 320 with respect to the second alloy layer 300 may be greater than 0% and less than or equal to 33%. When the area fraction of the second layer 320 with respect to the second alloy layer 300 exceeds 33%, the peeling resistance and the hydrogen embrittlement of a hot-stamping component manufactured by a method of manufacturing a hot-stamping component may be reduced.

The first layer 310 may have a hardness of 200 Hv to 800 Hv, the second layer 320 may have a hardness of 700 Hv to 1200 Hv, and the third layer 330 may have a hardness of 200 Hv to 800 Hv.

For example, the hot-stamping component may further include a surface layer on the second alloy layer 300. The surface layer is a layer including greater than or equal to 80 wt % of Al, and may prevent the steel plate 100 from being oxidized. For example, an average thickness of the surface layer on the steel plate 100 may be 100 nm to 200 nm.

Figure 7:
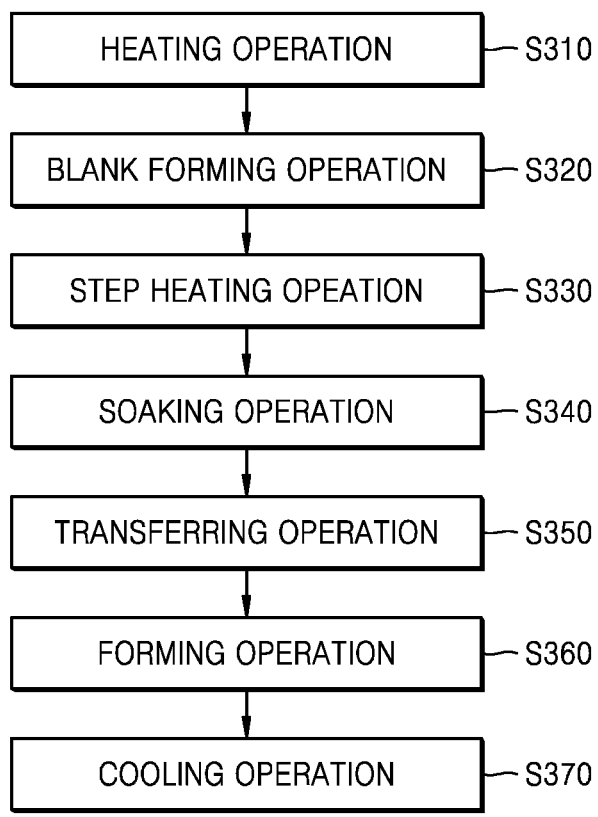
FIG. 7 is a schematic flowchart illustrating a method of manufacturing a hot-stamping component according to an exemplary embodiment.

FIG. 7 is a schematic flowchart illustrating a method of manufacturing a hot-stamping component according to an exemplary embodiment.

Referring to FIG. 7, a method of manufacturing a hot-stamping component according to an embodiment may include a heating operation S310, a blank forming operation S320, a step heating operation S330, a soaking operation S340, a transferring operation S350, a forming operation S360, and a cooling operation S370.

The heating operation S310 is an operation of heating a steel plate on which an Al—Si plated layer is formed. In detail, the heating operation S310 is an operation of forming a first alloy layer by heating the steel plate on which the Al—Si plated layer is formed. At this time, the steel plate on which the Al—Si plated layer is formed may be manufactured through the hot-rolling operation of a steel slab S210, the cooling/coiling operation S220, the cold-rolling operation S230, the annealing heat treatment operation S240, and the hot-dip plating operation S250.

In the heating operation S310, a heating time period and a heating temperature for heating the steel plate on which the Al—Si plated layer is formed may satisfy the following equation.

$$\ln(t) = \alpha + (\beta/(R \times T))$$ [Equation]

where t denotes the heating time period, α denotes a correction factor according to a plating amount, β denotes a correction factor according to a content of Si in the plated layer, R denotes a gas constant, and T denotes the heating temperature. In the above equation, the heating temperature T means an absolute temperature.

In the method of manufacturing a hot-stamping component according to an exemplary embodiment, because a plating amount of the Al—Si plated layer formed on the steel plate may be 40 $g/m^2$ to 200 $g/m^2$, the correction factor according to the plating amount may have a value of −31.09 to −10.36.

In addition, R may have a value of 84752.2 J/mol to 254256.5 J/mol by considering the content of Si in the Al—Si plated layer and an activation energy of Si.

For example, in the heating operation S310, the steel plate on which the Al—Si plated layer is formed may be heated at the heating temperature T. For example, in the heating operation S310, the steel plate on which the Al—Si plated layer is formed may be heated at a first temperature. At this time, the first temperature may be 540° C. to 600° C. When the first temperature is less than 540° C., time period required for alloying at least a portion of the steel plate and the Al—Si plated layer may increase, and thus, loss may occur in the operation. On the other hand, when the first temperature exceeds 600° C., in a manufacturing operation of a hot-stamping component, a liquid phase is formed on a surface of a blank, which may cause a mold seizure problem.

For example, in the heating operation S310, the steel plate on which the Al—Si plated layer is formed may be heated during a heating time period t. For example, in the heating operation S310, the steel plate on which the Al—Si plated layer is formed may be heated during a first time period. At this time, the first time period may include 10 minutes to 120 minutes. In detail, when the first temperature is 540° C., the first time period may be greater than 60 minutes and less than 120 minutes. When the first temperature is 600° C., the first time period may be greater than or equal to 10 minutes and less than 60 minutes. When the first time period is less than 10 minutes, the Al—Si plated layer may not be completely alloyed. On the other hand, when the first time exceeds 120 minutes, the productivity of a hot-stamping component may reduce due to an excessive heating time period.

In the heating operation S310, when the first temperature is 540° C., a minimum time period required for an entire alloying of the Al—Si plated layer may be about 60 minutes. That is, in the heating operation S310, an entire alloy layer may be formed only when the steel plate on which the Al—Si plated layer is formed is heated at 540° C. for about 60 minutes or more. Accordingly, when the first temperature is greater than 540° C., the minimum time period required for forming the entire alloy layer may be less than 60 minutes, and the minimum time period may be between 10 minutes to 60 minutes.

In addition, in the heating operation S310, when the first temperature is 600° C., the minimum time period required for the entire alloying of the Al—Si plated layer may be about 10 minutes. That is, in the heating operation S310, the entire alloy layer may be formed only when the steel plate on which the Al—Si plated layer is formed is heated at 600° C. for about 10 minutes or more. Accordingly, when the first temperature is less than 600° C., the minimum time period required for forming the entire alloy layer may be more than 10 minutes, and the minimum time period may be between 10 minutes to 60 minutes.

The blank forming operation S320 may be an operation of forming a blank by cutting the steel plate on which the first alloy layer is formed. In the blank forming operation S320, a blank may be formed by cutting the steel plate on which the first alloy layer is formed into a desired shape according to a purpose.

For example, the bank forming operation may be also performed before the heating operation S310. For example, after forming a blank by cutting the steel plate on which the Al—Si plated layer is formed, the heating operation S310 of heating the formed blank may be performed.

The step heating operation S330 may be an operation of heating a blank in stages, and the soaking operation S340 may be an operation of soaking the stepwise heated blank at a uniform temperature. In the step heating operation S330, as the blank passes through a plurality of sections provided in a heating furnace, the temperature of the blank may be raised in stages. There may be a plurality of sections in which the step heating operation S330 is performed, among the plurality of sections provided in the heating furnace, and the temperature is set for each section so as to increase in a direction from an inlet of the heating furnace into which the blank is inserted to an outlet of the heating furnace from which the blank is discharged, and thus the temperature of the blank may be raised in stages. After the step heating operation S330, the soaking operation S340 may be performed. In the soaking operation S340, the stepwise heated blank may be heat-treated while passing through a section of the heating furnace set as a temperature of Ac3 to 1000° C. Preferably, in the soaking operation S340, the stepwise heated blank may be soaked at a temperature of 930° C. to 1000° C. More preferably, in the soaking operation S340, the stepwise heated blank may be soaked at a temperature of 950° C. to 1000° C. Also, among the plurality of sections provided in the heating furnace, there may be at least one section in which the soaking operation S340 is performed.

Figure 8:
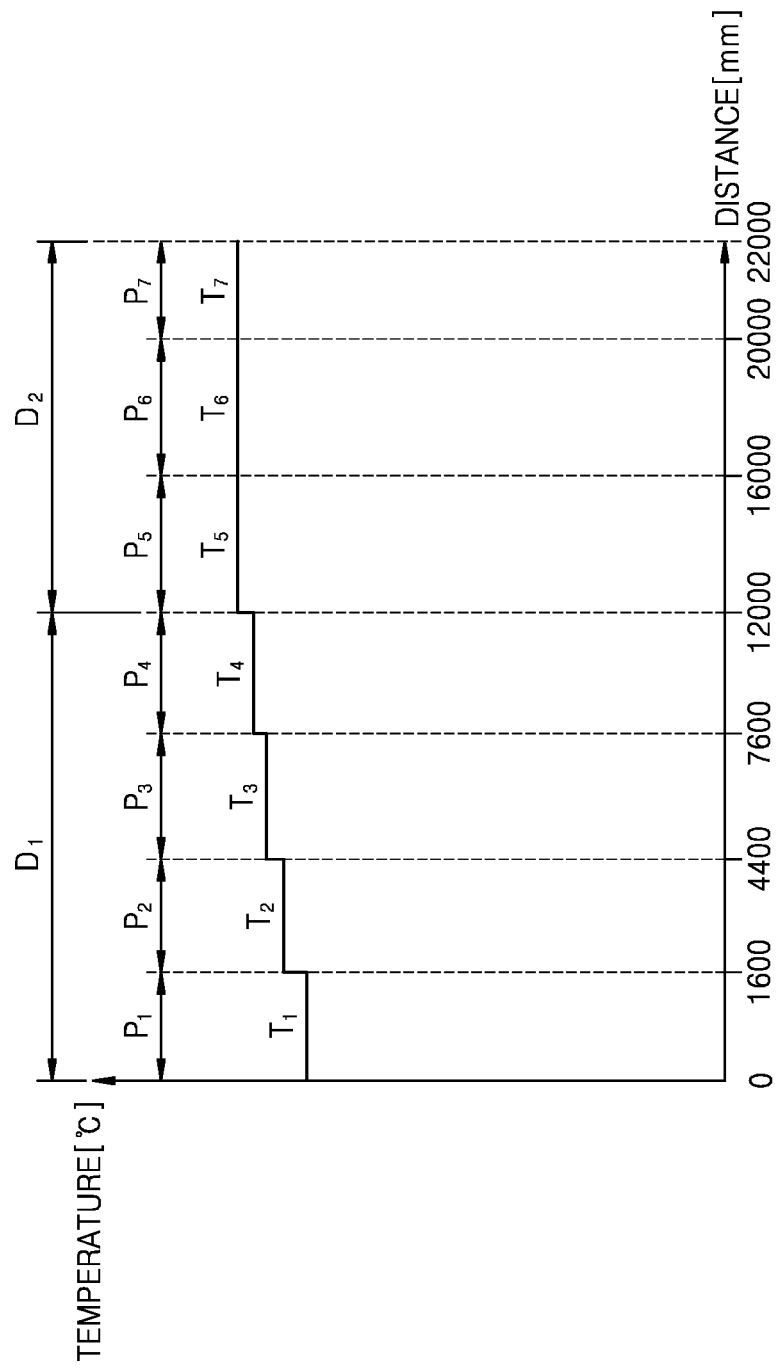
FIG. 8 is a diagram for explaining a heating furnace having a plurality of sections in a step heating operation and a soaking operation in a method of manufacturing a hot-stamping component according to an exemplary embodiment.

FIG. 8 is a diagram for explaining a heating furnace having a plurality of sections in a step heating operation and a soaking operation in a method of manufacturing a hot-stamping component according to an exemplary embodiment.

Referring to FIG. 8, the heating furnace according to an embodiment may include a plurality of sections with different temperature ranges from each other. In more detail, the heating furnace may include a first section $P_1$ having a first temperature range $T_1$, a second section $P_2$ having a second temperature range $T_2$, a third section $P_3$ having a third temperature range $T_3$, a fourth section $P_4$ having a fourth temperature range $T_4$, a fifth section $P_5$ having a fifth temperature range $T_5$, a sixth section $P_6$ having a sixth temperature range $T_6$, and a seventh section $P_7$ having a seventh temperature range $T_7$.

For example, in the step heating operation S330, a blank may be stepwise heated in stages while passing through a plurality of sections (for example, the first section $P_1$ to the fourth section $P_4$) defined in the heating furnace. In addition, in the soaking operation S340, the blank stepwise heated in the first section $P_1$ to the fourth section $P_4$ may be soaked in the fifth section $P_5$ to the seventh section $P_7$.

The first to seventh sections $P_1$ to $P_7$ may be sequentially arranged in the heating furnace. The first section $P_1$ having the first temperature range $T_1$ may be adjacent to an inlet of the heating furnace into which the blank is inserted, and the seventh section $P_7$ having the seventh temperature range $T_7$ may be adjacent to an outlet of the heating furnace from which the blank is discharged. Accordingly, the first section $P_1$ having the first temperature range $T_1$ may be a first section of the heating furnace, and the seventh section $P_7$ having the seventh temperature range $T_7$ may be a last section of the heating furnace. The fifth section $P_5$, the sixth section $P_6$, and the seventh section $P_7$ among the plurality sections of the heating furnace, may not be sections in which step heating is performed, but rather be sections in which soaking is performed.

Temperatures of the plurality of sections provided in the heating furnace, for example, temperatures of the first to seventh sections $P_1$ to $P_7$, may increase in a direction from the inlet of the heating furnace into which the blank is inserted to the outlet of the heating furnace from which the blank is discharged. However, temperatures of the fifth section $P_5$, the sixth section $P_6$, and the seventh section $P_7$ may be the same. Also, a difference in temperature between two adjacent sections, among the plurality of sections provided in the heating furnace, may be greater than 0° C. and less than or equal to 100° C. For example, a difference in temperature between the first section $P_1$ and the second section $P_2$ may be greater than 0° C. and less than or equal to 100° C.

For example, the first temperature range $T_1$ of the first section $P_1$ may be 840° C. to 860° C., or 835° C. to 865° C. The second temperature range $T_2$ of the second section $P_2$ may be 870° C. to 890° C., or 865° C. to 895° C. The third temperature range $T_3$ of the third section $P_3$ may be 900° C. to 920° C., or 895° C. to 925° C. The fourth temperature range $T_4$ of the fourth section $P_4$ may be 920° C. to 940° C., or 915° C. to 945° C. The fifth temperature range $T_5$ of the fifth section $P_5$ may be Ac3 to 1000° C. Preferably, the fifth temperature range $T_5$ of the fifth section $P_5$ may be 930° C. or more and 1000° C. or less. More preferably, the fifth temperature range $T_5$ of the fifth section $P_5$ may be 950° C. or more and 1000° C. or less. The sixth temperature range $T_6$ of the sixth section $P_6$ and the seventh temperature range $T_7$ of the seventh section $P_7$ may be the same as the fifth temperature range $T_5$ of the fifth section $P_5$.

Although it is shown in FIG. 8 that the heating furnace according to an embodiment includes seven sections with different temperature ranges from each other, the present disclosure is not limited thereto. Five, six, or eight sections with different temperature ranges from each other may be provided in the heating furnace.

The soaking operation S340 may be performed in the last portion among the plurality of sections of the heating furnace. For example, the soaking operation S340 may be performed in the fifth section $P_5$, the sixth section $P_6$, and the seventh section $P_7$ of the heating furnace. When a plurality of sections are provided in the heating furnace and a length of one section is long, there may be a problem such as a change in temperature within the section. Accordingly, the section in which the soaking operation S340 is performed may be divided into the fifth section $P_5$, the sixth section $P_6$, and the seventh section $P_7$, and the fifth section $P_5$, the sixth section $P_6$, and the seventh section $P_7$ may have the same temperature range in the heating furnace.

In the soaking operation S340, the stepwise heated blank may be soaked at a temperature of Ac3 to 1000° C. Preferably, in the soaking operation S340, the stepwise heated blank may be soaked at a temperature of 930° C. to 1000° C. More preferably, in the soaking operation S340, the stepwise heated blank may be soaked at a temperature of 950° C. to 1000° C.

For example, a ratio of a length $D_1$ of a section for step heating the blank to a length $D_2$ of a section for soaking the blank may be 1:1 to 4:1. In more detail, a ratio of a sum of lengths of the first section $P_1$ to the fourth section $P_4$, which are sections for step heating the blank, to a sum of lengths of the fifth section $P_5$ to the seventh section $P_7$, which are sections for soaking the blank, may satisfy 1:1 to 4:1. When the length of the section for soaking the blank increases, so that the ratio of the length $D_1$ of the section for step heating the blank to the length $D_2$ of the section for soaking the blank is greater than 1:1, an austenite (FCC) structure is generated in the soaking section, which may increase an amount of hydrogen permeated into the blank, thereby increasing the risk of delayed fracture. Also, when the length of the section for soaking the blank decreases, so that the ratio of the length $D_1$ of the section for step heating the blank to the length $D_2$ of the section for soaking the blank is less than 4:1, sufficient sections (periods of time) for soaking are not secured, and thus the strength of a component manufactured by the method of manufacturing a hot-stamping component may be uneven.

For example, the length of the section for performing soaking operation S340, among the plurality of sections provided in the heating furnace, may be 20% to 50% of a total length of the heating furnace. In addition, in the step heating operation S330 and the soaking operation S340, at least two blanks having different thicknesses from each other may be simultaneously transferred in the heating furnace.

For example, the blank may remain in the heating furnace for 180 seconds to 360 seconds. That is, a period of time for step heating the blank and soaking the blank may be 180 seconds to 360 seconds. When the period of time for the blank to remain in the heating furnace is less than 180 seconds, it may be difficult for the blank to be sufficiently soaked at a desired temperature. Also, when the period of time for the blank to remain in the heating furnace is more than 360 seconds, an amount of hydrogen permeated into the blank increases, thereby leading to an increased risk of delayed fracture and deterioration in corrosion resistance after a hot stamping operation.

The transferring operation S350 is an operation of transferring the heated (or, soaked) blank from the heating furnace to a press mold. In the transferring operation S350, the heated (or, soaked) blank may be air-cooled for 10 seconds to 15 seconds.

The forming operation S360 is an operation of forming a molded body by hot-stamping the transferred blank. The cooling operation S370 is an operation of cooling the formed molded body.

A final product may be formed by cooling the molded body at the same time as molding the molded body into a final component shape. A cooling channel through which a refrigerant circulates may be provided in the press mold. The heated blank may be rapidly cooled by circulation of the refrigerant supplied through the cooling channel provided in the press mold. In this regard, in order to prevent a spring back phenomenon and maintain a desired shape of a plate material, the blank may be pressed and rapidly cooled while the press mold is closed. When molding and cooling the heated blank, the blank may be cooled with an average cooling rate of at least 10° C./s to a martensite end temperature. The blank may be held in the press mold for 3 seconds to 20 seconds. When a period of time for the blank being held in the press mold is less than 3 seconds, cooling of a material is not sufficiently performed, and thus temperature variation of each portion due to residual heat may affect embrittlement quality. In addition, because a sufficient amount of martensite is not generated, mechanical properties may not be secured. On the other hand, when the period of time for the blank being held in the press mold is more than 20 seconds, the time being held in the press mold may be increased, thereby causing lower productivity.

Figure 9:
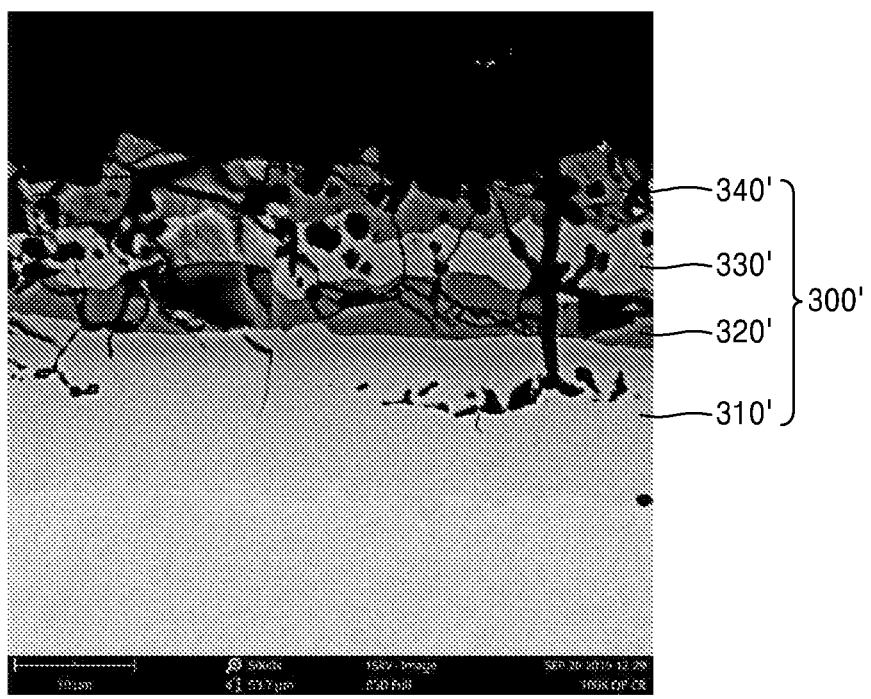
FIG. 9 is a diagram showing a cross-section of a component manufactured by using a method of manufacturing a hot-stamping component in which a heating operation is omitted according to an exemplary embodiment.

FIG. 9 is a diagram showing a cross-section of a component manufactured by using a method of manufacturing a hot-stamping component in which the heating operation S310 is omitted.

Referring to FIGS. 6 and 9, the hot-stamping component manufactured by using the method of manufacturing a hot-stamping component, in which the heating operation S310 is included, may include the second alloy layer 300, and the second alloy layer 300 may include the first layer 310, the second layer 320, and the third layer 330, which are sequentially stacked. At this time, the first layer 310 may include α-Fe, the second layer 320 may include $Fe_2Al_5$, and the third layer 330 may include FeAl.

The hot-stamping component manufactured by using a manufacturing method, in which the heating operation S310 is omitted, may include the second alloy layer 300'. The second alloy layer 300' of the hot-stamping component manufactured by using the manufacturing method in which the heating operation S310 is omitted may include a first layer 310', a second layer 320', a third layer 330', and a fourth layer 340', which are sequentially stacked. At this time, the first layer 310' may include α-Fe, the second layer 320' may include $Fe_2Al_5$, the third layer 330' may include FeAl, and the fourth layer 340' may include $Fe_2Al_5$.

An outermost layer of the second alloy layer 300 included in the hot-stamping component manufactured by using the manufacturing method including the heating operation S310 is an FeAl phase, but it can be confirmed that an outermost layer of the second alloy layer 300' included in the hot-stamping component manufactured by using the manufacturing method in which the heating operation S310 is omitted is an $Fe_2Al_5$ phase.

Accordingly, when the blank is preheated (the heating operation S310) before the step heating operation S330 and the soaking operation S340, it can be confirmed that the $Fe_2Al_5$ phase is not formed in the second alloy layer 300 included in a final hot-stamping component.

As compared with the FeAl phase, the $Fe_2Al_5$ phase has a higher crack generation frequency and higher crack propagation degree. When a component is manufactured through the method of manufacturing a hot-stamping component according to an embodiment, because an $Fe_2Al_5$ phase which presents on an outermost surface of the second alloy layer 300 disappears, a frequency of occurrence of cracks may be lowered, propagation of cracks may be suppressed, and the peeling resistance of the manufactured component may be improved.

When the blank on which the Al—Si plated layer is formed on the steel plated is heated to the temperature of a hot stamping operation, at least a portion of the Al—Si plated layer remained without forming an alloy layer, resulting in a liquid phase of the Al—Si plated layer was formed. At this time, because the liquid phase of the Al—Si plated layer has a faster hydrogen diffusion rate and stronger surface hydrogen adsorption than an alloy layer, hydrogen was introduced into a steel plate through the Al—Si plated layer, causing hydrogen delayed fracture. In addition, the liquid phase of Al—Si plated layer was sintered to the mold, resulting in a decrease in productivity.

Figure 10:
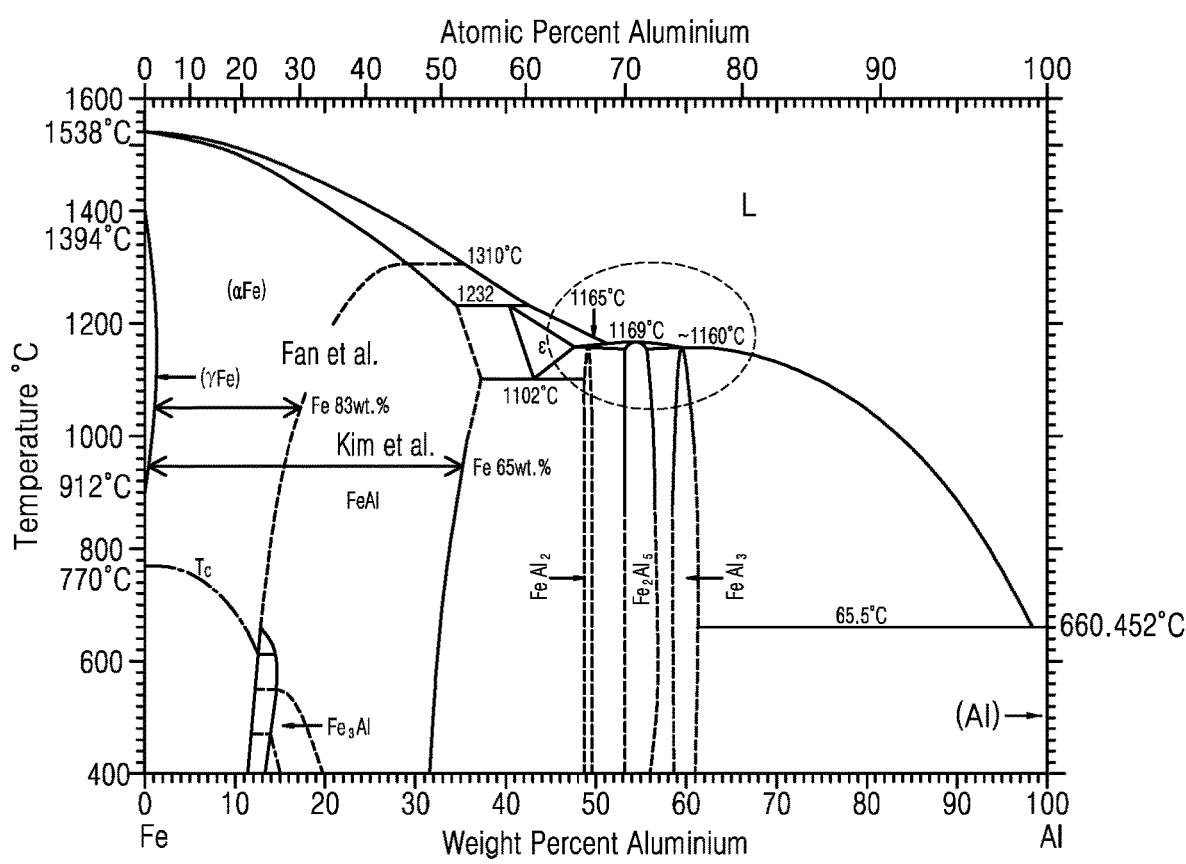
FIG. 10 is a diagram showing an equilibrium diagram of iron (Fe)-aluminum (Al).

FIG. 10 is a diagram showing an equilibrium diagram of Fe—Al.

Referring to FIG. 10, in the equilibrium diagram of Fe—Al, it can be seen that the melting point of $FeAl_3$ is about 1160° C., and the melting point $Fe_2Al_5$ of is about 1169° C. Accordingly, when forming an FeAl alloy, the alloy may have a melting point greater than that of the Al—Si (about 660° C.).

For example, before heating (step heating and soaking) a steel plate on which the Al—Si plated layer is formed, the steel plate on which the Al—Si plated layer is formed is heated at the first temperature for the first time period, so that at least a portion of the steel plate and the Al—Si plated layer may be alloyed to form a first alloy layer. Thereafter, the steel plate on which the first alloy layer is formed is heated (step heating and soaking) to manufacture a hot-stamping component, and thus hydrogen delayed fracture of the manufactured component may be prevented or minimized, and at the same time, occurrence of mold seizure during the operation may be prevented or minimized.

Hereinafter, the present disclosure will be described in more detail through embodiments. However, the following embodiments are for explaining the present disclosure in more detail, and the scope of the present disclosure is not limited to the following embodiments. Numerous modifications and adaptations will be readily apparent to one of ordinary skill in the art without departing from the spirit and scope.

TABLE 1

| Component (wt %) | | | | | | | |
| --- | --- | --- | --- | --- | --- | --- | --- |
| C | Si | Mn | P | S | Cr | Ti | B |
| 0.23 | 0.24 | 1.17 | 0.014 | 0.002 | 0.17 | 0.03 | 0.002 |

TABLE 2

| | Heating Temperature | Heating Time |
| --- | --- | --- |
| Embodiment 1 | 540° C. | 60 minutes |
| Embodiment 2 | 600° C. | 10 minutes |
| Comparative Example 1 | — | — |
| Comparative Example 2 | 540° C. | 55 minutes |
| Comparative Example 3 | 600° C. | 8 minutes |
| Comparative Example 4 | 480° C. | 9 hours |
| Comparative Example 5 | 520° C. | 130 minutes |
| Comparative Example 6 | 500° C. | 270 minutes |
| Comparative Example 7 | 540° C. | 145 minutes |
| Comparative Example 8 | 570° C. | 280 minutes |
| Comparative Example 9 | 600° C. | 10 hours |

TABLE 3

| Section of Heating Furnace | First Section | Second Section | Third Section | Fourth Section | Fifth Section | Sixth Section | Seventh Section |
| --- | --- | --- | --- | --- | --- | --- | --- |
| Length of Heating Furnace | 1600 mm | 2800 mm | 3200 mm | 4400 mm | 4000 mm | 4000 mm | 2000 mm |

TABLE 4

| Section of Heating Furnace | Temperature Set for Each Section of Heating Furnace | | | | | | | Heating Furnace Retention Time (Seconds) |
| --- | --- | --- | --- | --- | --- | --- | --- | --- |
| | First Section | Second Section | Third Section | Fourth Section | Fifth Section | Sixth Section | Seventh Section | |
| Temperature | 820° C. | 850° C. | 880° C. | 910° C. | 950° C. | 950° C. | 950° C. | 200 |

Table 1 is a table showing a composition of a steel plate, Table 2 is a table showing the heating temperatures and heating time period of Embodiments 1 and 2, and Comparative Examples 1 to 9, Table 3 is a table showing a length of each section of the heating furnace, and Table 4 is a table showing set temperature for each section of the heating furnace and the retention time in the heating furnace.

After heating a blank on which an Al—Si plated layer was formed on a steel plate having a composition of Table 1 according to conditions of Table 2, the heated blank was stepwise heated and soaked in the heating furnace satisfying conditions of Tables 3 and 4 to manufacture a hot-stamping component.

In Table 2, Embodiments 1 and 2 correspond to a case of which the heating temperature and the heating time period of the heating operations S120 and S130 were satisfied, Comparative Example 1 corresponds to a case of which the heating operations S120 and 130 were not performed, Comparative Examples 2 and 3 correspond to a case of which the heating time period of the heating operations S120 and S310 was not satisfied, and Comparative Examples 4 to 6 correspond to a case of which the heating temperature of the heating operations S120 and S310 was not satisfied.

As in Embodiments 1 and 2, when the heating temperature and the heating time period of the heating operations S120 and S310 were satisfied, at least a portion of the steel plate and the Al—Si plated layer formed on the steel plate may be alloyed to form an entire alloy layer.

However, as in Comparative Examples 1 to 6, when the heating operations S120 and S310 were omitted or the heating temperature and/or the heating time period of the heating operations S120 and S310 are not satisfied, the Al—Si plated layer may remain on the steel plate.

In addition, Comparative Examples 7 to 9 correspond to a case of which the heating time period of the heating operations S120 and S310 was exceeded. Even in Comparative Examples 7 to 9, at least a portion of the steel plate and the Al—Si plated layer on the steel plate may be alloyed to form an entire alloy layer. However, in the case of Comparative Examples 7 to 9, the productivity of the hot-stamping component may decrease due to excessive heating time period.

<Evaluation of an Amount of Diffusible Hydrogen and Hydrogen Delayed Fracture>

Thermal desorption spectroscopy was performed on Embodiments 1 and 2, and Comparative Examples 1 to 9. In detail, an amount of diffusible hydrogen emitted from the hot-stamping component was measured under 350° C. or less, while raising the temperature form room temperature to 500° C. at a heating rate of 20° C./min. The evaluation of the hydrogen delayed fracture was performed by a four-point bending test. The four-point bending test is a test method for checking whether stress corrosion cracking occurs by applying a stress having a level below an elastic limit at a particular point of a specimen manufactured by reproducing a state exposed to a corrosive environment. At this time, stress corrosion cracking refers to a crack that occurs when corrosion and continuous tensile stress act simultaneously.

TABLE 5

| | Amount of Diffusible Hydrogen (wppm) | Hydrgen Delayed Fracture |
|---|---|---|
| Embodiment 1 | 0.376 | Non-fractured |
| Embodiment 2 | 0.364 | Non-fractured |
| Comparative Example 1 | 0.923 | Fractured |
| Comparative Example 2 | 0.759 | Fractured |
| Comparative Example 3 | 0.702 | Fractured |
| Comparative Example 4 | 0.816 | Fractured |
| Comparative Example 5 | 0.768 | Fractured |
| Comparative Example 6 | 0.769 | Fractured |
| Comparative Example 7 | 0.391 | Non-fractured |
| Comparative Example 8 | 0.403 | Non-fractured |
| Comparative Example 9 | 0.401 | Non-fractured |

Table 5 is a table showing evaluation results of the amount of diffusible hydrogen emitted from Embodiments 1 and 2, and Comparative Examples 1 to 9, and evaluation results of hydrogen delayed fracture.

Referring to Table 5, it can be seen that the amount of diffusible hydrogen emitted from Comparative Example 1 was greater than the amount of diffusible hydrogen emitted from Embodiments 1 and 2. Accordingly, it can be seen that an amount of hydrogen inflow from the outside was reduced when the heating operations S120 and S310 is performed before the hot stamping operation.

In addition, it can be seen that the amount of diffusible hydrogen emitted from Comparative Examples 2 and 3 (a case of which the heating time period is not satisfied) was greater than the amount of diffusible hydrogen emitted from Embodiments 1 and 2.

In addition, it can be seen that the amount of diffusible hydrogen emitted from Comparative Examples 4 to 6 (a case of which the heating temperature is not satisfied) was greater than the amount of diffusible hydrogen emitted from Embodiments 1 and 2.

However, it can been seen that the amount of diffusible hydrogen emitted from Comparative Examples 7 to 9 (a case of which the heating temperature is satisfied but the heating time period exceeds 60 minutes) was greater than the amount of diffusible hydrogen emitted from Embodiments 1 and 2 but was less than the amount of diffusible hydrogen emitted from Comparative Examples 1 to 6.

Accordingly, it can be seen that because the amount of diffusible hydrogen emitted from the hot-stamping component manufactured when the heating operations S120 and S310 were performed before performing the hot stamping operation, the amount of hydrogen inflow from the outside was reduced.

However, although the amount of diffusible hydrogen emitted from the hot-stamping component manufactured is reduced even when the steel plate on which the Al—Si plated layer is formed is heated for more than 120 minutes at the first temperature before performing the hot stamping operation, the productivity of the hot-stamping component may be reduced due to excessive heating time period when the heating time period exceeds 120 minutes.

According to the evaluation result of the hydrogen delayed fracture, although fracture did not occur in Embodiments 1 and 2, and Comparative Examples 7 to 9, fracture occurred in Comparative Examples 1 to 6.

Accordingly, when the heating operations S120 and S310 are performed before performing the hot stamping operation, the amount of hydrogen inflow from the outside was reduced, and thus, the resistance to hydrogen delayed fracture was excellent. Therefore, the hydrogen embrittlement of the manufactured hot-stamping component may be improved when the steel plate on which the Al—Si plated layer is formed is heated at the first temperature for the first time period before performing the hot stamping operation.

<Evaluation of Peeling Resistance>

An adhesion strength of an alloy layer was measured through a dolly test so as to evaluate the peeling resistance of Embodiments 1 and 2, and Comparative Examples 1 to 6. The adhesion strength was measured under conditions of a speed of 0.6 Mpa/s, a peeling area of 20 pi, a maximum load of 24 MPa, a curing temperature of 120° C., and a curing time of 20 minutes.

TABLE 6

|  | Adhesion Strength |
|---|---|
| Embodiment 1 | 6.29 MPa |
| Embodiment 2 | 6.44 MPa |
| Comparative Example 1 | 3.44 MPa |
| Comparative Example 2 | 4.08 MPa |
| Comparative Example 3 | 3.34 MPa |
| Comparative Example 4 | 3.52 MPa |
| Comparative Example 5 | 3.79 MPa |
| Comparative Example 6 | 3.12 MPa |

Table 6 is a table showing results of the dolly test of Embodiments 1 and 2, and Comparative Examples 1 to 6.

Referring to FIG. 6, it can be seen that the adhesion strength of Embodiments 1 and 2 was greater than that of Comparative Examples 1 to 6.

Accordingly, it can be seen that the peeling resistance of the hot-stamping component in which the heating operations S120 and S310 were performed before performing the hot stamping operation was greater than the peeling resistance of the hot-stamping component in which the heating operations S120 and S310 were omitted or a heating operation which did not satisfy the heating condition was performed.

Accordingly, the peeling resistance of the hot-stamping component manufactured when the heating operations S120 and S310 are performed before performing the hot stamping operation may be improved.

According to exemplary embodiments of the present disclosure, the steel plate on which the Al—Si plated layer is formed is heated at the first temperature for the first time period before performing the hot stamping operation, so that an entire alloy layer provided as a single layer may be formed on the steel plate.

In addition, the hot-stamping component is manufactured by step heating and soaking a blank on which the alloy layer is formed on the steel plate, and thus, the hydrogen embrittlement and the peeling resistance of the manufactured component may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of manufacturing a hot-stamping component, the method comprising:
   heating a steel plate on which a plated layer is formed at a first temperature for a first time period;
   forming a blank by cutting the heated steel plate;
   stepwise heating the blank in stages; and
   soaking the stepwise heated blank at a temperature of Ac3 to 1000° C.,
   wherein the first temperature is 540° C. to 600° C.,
   wherein the stepwise heating and the soaking are performed in a heating furnace having a plurality of sections having different temperature ranges from each other.

2. The method of claim 1, wherein among the plurality of sections, a ratio of a length of sections for step heating the blank to a length of a section for soaking the blank is in a range of 1:1 to 4:1.

3. The method of claim 1, wherein temperatures of the plurality of sections increase in a direction from an inlet of the heating furnace to an outlet of the heating furnace.

4. The method of claim 1, wherein a difference in temperature between two adjacent sections among the sections for step heating the blank is greater than 0° C. and less than or equal to 100° C.

5. The method of claim 1, wherein among the plurality of sections, a temperature of the section for soaking the blank is greater than a temperature of the sections for step heating the blank.

6. The method of claim 1, further comprising, after the soaking of the blank:
   transferring the soaked blank from the heating furnace to a press mold;
   forming a molded body by hot-stamping the transferred blank; and
   cooling the formed molded body.

* * * * *